United States Patent
Lee et al.

(10) Patent No.: US 8,496,873 B2
(45) Date of Patent: Jul. 30, 2013

(54) ALLOY NANOPARTICLES OF SN-CU-AG, PREPARATION METHOD THEREOF AND INK OR PASTE USING THE ALLOY NANOPARTICLES

(75) Inventors: Kwi-Jong Lee, Hwaseong-si (KR);
Hyuck-Mo Lee, Daejoen (KR);
Hyun-Joon Song, Daejeon (KR);
Yun-Hwan Jo, Goyang-si (KR);
Ji-Chan Park, Daegu (KR); Jung-Up Bang, Ulsan (KR); Dong-Hoon Kim, Seongnam-si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 13/495,887

(22) Filed: Jun. 13, 2012

(65) Prior Publication Data

US 2012/0272790 A1 Nov. 1, 2012

Related U.S. Application Data

(62) Division of application No. 12/437,945, filed on May 8, 2009, now abandoned.

(30) Foreign Application Priority Data

Aug. 11, 2008 (KR) ........................ 10-2008-0078611

(51) Int. Cl.
*C22C 13/00* (2006.01)

(52) U.S. Cl.
USPC ..... 420/560; 420/557; 252/518.1; 252/520.1; 428/646; 428/647

(58) Field of Classification Search
USPC ..... 252/518.1, 520.1; 428/646, 647; 420/557, 420/560
See application file for complete search history.

(56) References Cited

FOREIGN PATENT DOCUMENTS

| JP | 2003-321702 | 11/2003 |
|---|---|---|
| JP | 2003-321702 A | 11/2003 |
| JP | 2004-266176 | 9/2004 |
| KR | 10-2008-0010691 | 1/2008 |
| WO | WO 2006/019144 | 2/2006 |
| WO | WO 2008/001741 | 1/2008 |

OTHER PUBLICATIONS

Tin/Silver/Copper Alloy Nanoparticle pastes for low temperature Lead-Free interconnect Applications, Jiang et al., 2008 Electronic components and Technology Conference, p. 1400-1404.*
Synthesis and Characterization of Lead-Free Solders with Sn-3.5Ag-xCu (x=0.2, 0.5, 1.0) Alloy Nanoparticles by the Chemical Reduction Method, Hsiao et al., Journal of the Electrochemical Society, 152 (9)J105-J119, 2005.*
Japanese Office Action, and English translation thereof, issued in Japanese Patent Application No. 2009-120508 dated Sep. 4, 2012.
Korean Office Action, with partial English translation, issued in Korean Patent Application No. 10-2008-0078611, mailed Jul. 29, 2010.
Jiang, H., et al., "Tin/Silver/Copper Alloy Nanoparticle Pastes for Low Temperature Lead-free Interconnect Applications", Electronic Components and Technology Conference, 2008, pp. 1400-1404, IEEE.
Japanese Office Action, with partial English Translation, issued in Japanese Patent Application No. 2009-120508, dated Apr. 17, 2012.
Journal of the Electrochemical Society, Hsiao et al., 152 (9) J105-J119, 2005.

* cited by examiner

*Primary Examiner* — Mark Kopec
*Assistant Examiner* — Haidung Nguyen
(74) *Attorney, Agent, or Firm* — McDermott Will & Emery LLP

(57) ABSTRACT

The invention relates to Sn—Cu—Ag alloy nanoparticles, preparation method thereof and ink or paste using the alloy nanoparticles in which the alloy nanoparticles are suitable for metal ink having excellent electrical conductivity or solder materials having low calcinating temperature.

11 Claims, 5 Drawing Sheets

ALLOY NANOPARTICLES OF SN-CU-AG, PREPARATION METHOD THEREOF AND INK OR PASTE USING THE ALLOY NANOPARTICLES

CROSS-REFERENCE TO RELATED APPLICATIONS

This application is a Divisional of U.S. application Ser. No. 12/437,945, filed on May 8, 2009, now abandoned which claims the benefit of Korean Patent Application No. 10-2008-0078611 filed with the Korean Intellectual Property Office on Aug. 11, 2008, the disclosures of which are incorporated herein by reference.

BACKGROUND

1. Technical Field

The present invention relates to Sn—Cu—Ag alloy nanoparticles, a preparation method thereof and ink or paste using the alloy nanoparticles.

2. Description of the Related Art

Nanoparticles, which are particles having a particle size of nano scale, exhibit a number of special properties such as optical, electronic and magnetic properties that differ significantly from those observed in bulk material due to size-dependent properties such as quantum confinement effect and a very high surface area to volume ratio.

Nanoparticle research is currently an area of intense scientific research in catalytic, electronic and magnetic, optical, and medical fields due to such special properties. Nanoparticles are a bridge between bulk materials and molecular structures and preparation of nanoparticles can be classified into two methods, "top-down approach" and "bottom-up approach".

The top-down approach involves the breaking down of bulk materials. It may easily control size of nanoparticles but may be difficult to provide nanoparticles having a size of less than 50 nm. Thus, the bottom-up approach, which implies assembling single atoms and molecules into larger nanostructures, has currently more attention and involves generally a colloid liquid phase synthesis when nanoparticles are formed from chemical molecular or atom precursors.

Sn—Pb solder materials, especially a material having a low melting temperature (m.p. 183° C.) and including 63/37 Sn/Pb, have been generally used to join a substrate and electronic elements of circuit boards embedded in electronic devices. However, since wastes can contain Pb(lead) found in Sn—Pb solder materials and cause environmental pollution, development on lead-free solder materials has been significantly growing. The Ag—Cu—Sn family among such Pb-free solders has the most promise as the main replacement of Sn—Pb solder. Most of Ag—Cu—Sn solder materials have composition with 95 wt % or less of Sn. The melting temperature is an important factor as the solder material. When higher content of Sn is used, it may be advantage in the melting temperature but it may deteriorate electrical conductivity, thermal stability, uniformity and the like. Thus, 95 wt % of Sn or less has been used. Based on such information, the invention is to provide a method to increase the content of Sn to lower melting temperature of alloy nanoparticles and at the same time to exhibit electrical conductivity and stability.

SUMMARY

An aspect of the invention is to provide Sn—Cu—Ag alloy nanoparticles which exhibit good electrical conductivity and low calcinating temperature, a manufacturing method thereof and materials such as ink or paste using the alloy nanoparticles.

Another aspect of the invention is to provide alloy nanoparticles including Sn in the range of from more than 95 wt % to 99.9 wt % or less and at least one chosen from the group consisting of Ag and Cu in the range of from 0.1 wt % or more to less than 5 wt %.

According to an embodiment of the invention, size of alloy nanoparticles may be in the range of 5 to 300 nm and such alloy nanoparticles have a melting temperature of 150 to 250° C.

Another aspect of the invention is to provide ink or paste using the alloy nanoparticles.

Another aspect of the invention is to provide a method for manufacturing alloy nanoparticles, the method including: dissolving a Sn salt and a surfactant in a solvent; forming Sn nanoparticles by adding a reducing agent into the solution; and forming Sn—Cu nanoparticles by adding a Cu salt to the solution including the reducing agent.

According to an embodiment of the invention, the method may further include forming Sn—Cu—Ag alloy nanoparticles by adding a Ag salt after the Sn—Cu nanoparticles are formed.

According to an embodiment of the invention, the solvent may be at least one alcohol chosen from ethylene glycol, diethylene glycol, tetraethylene glycol, and 1-5-pentandiol.

Further, the tin salt may be at least one tin salt chosen from $Sn(NO_3)_2$, $SnCl_2$, $SnBr_2$, $SnI_2$, $Sn(OH)_2$, $SnSO_4$, $Sn(CH_3COO)_2$, $Sn(CH_3COCHCOCH_3)_2$ and the like.

According to an embodiment of the invention, the forming Sn nanoparticles by adding a reducing agent into the solution may be conducted at a temperature of 100 to 260° C.

According to an embodiment of the invention, the forming Sn—Cu alloy nanoparticles by adding a copper salt may be conducted within 3 to 60 mins after the Sn nanoparticles are formed by adding a reducing agent into the solution.

Here, the copper salt may be at least one copper salt chosen from $Cu(NO_3)_2$, $CuCl_2$, $CuBr_2$, $CuI_2$, $Cu(OH)_2$, $CuSO_4$, $Cu(CH_3COO)_2$, $Cu(CH_3COCHCOCH_3)_2$ and the like. The copper salt may be added directly to the solution or after it is dissolved in a solvent.

The Sn—Cu alloy nanoparticles may include Sn in the range of from more than 95 wt % to 99.9 wt % or less and Cu in the range of from 0.1 wt % or more to less than 5 wt %.

According to an embodiment of the invention, a silver salt may be added to provide Sn—Cu—Ag alloy nanoparticles after the Sn—Cu alloy nanoparticles are formed.

Here, the silver salt may be at least one silver salt chosen from $AgNO_3$, $AgCl$, $AgBr$, $AgI$, $AgOH$, $Ag_2SO_4$, $AgCH_3COO$, $AgCH_3COCHCOCH_3$ and the like. The silver salt may be added directly to the solution or after it is dissolved in a solvent.

According to an embodiment of the invention, the forming Sn—Cu—Ag alloy nanoparticles by adding a silver salt may be conducted within 3 to 60 mins after the Sn—Cu nanoparticles are formed.

The Sn—Cu—Ag alloy nanoparticles may include Sn in the range of from more than 95 wt % to 99.9 wt % or less and Ag and Cu in the range of from 0.1 wt % or more to less than 5 wt %.

Additional aspects and advantages of the present invention will be set forth in part in the description which follows, and in part will be obvious from the description, or may be learned by practice of the invention.

DETAILED DESCRIPTION

Figure 1:
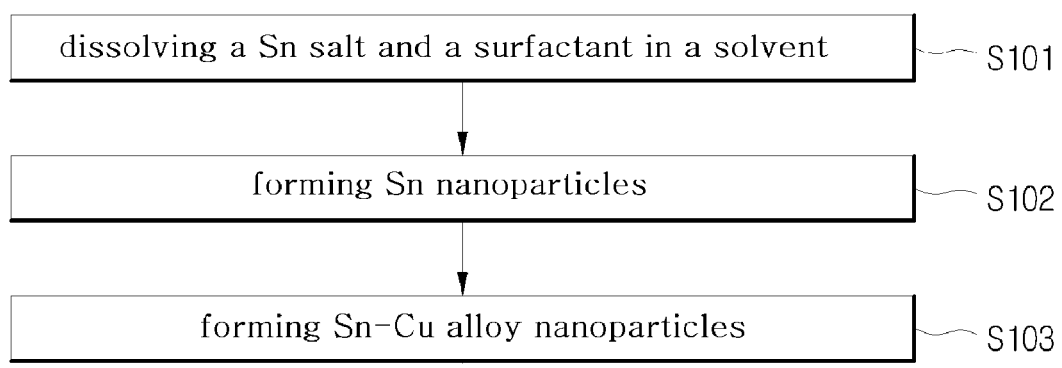
FIG. 1 is a flow chart illustrating a method of manufacturing alloy nanoparticles according to an embodiment of the invention.

When copper is formed into nanoparticles, the surface of nanoparticles gets too easily oxidized due to increased surface area and such oxidation causes the formation of oxidation layer which further deteriorates electrical conductivity. When silver is formed into nanoparticles, they have good stability against oxidation and conductivity but cause migration and shorts at a high temperature and a high humidity after they are formed into printed circuit boards. However, alloy nanoparticles may compromise such problems with keepting each metal's characteristics. For example, when copper and silver are alloyed with tin, which lowers the melting temperature, each metal's drawbacks may be compromised so that both stability of the alloy and lowering the melting temperature (further, lowering calcinating temperature) can be obtained at the same time.

In case of Ag—Cu—Sn alloy, even though the alloy including 95% or less of Sn has been developed, any alloy including more than 95% of Sn in uniform and several hundreds of nm size of nanoparticles has not been developed yet.

According to an aspect of the invention, the alloy nanoparticles, including 95 wt % or more of Sn and a small amount of Cu and Ag and being suitable for forming metal inks or printed circuit patterns with lower calcinating temperature and having high electrical conductivity, electrical reliability and oxidation resistance, is provided.

According to an aspect of the invention, the alloy nanoparticles including Sn in the range of from more than 95 wt % to 99.9 wt % or less is provided. The melting temperatures of pure Ag, pure Sn, pure Cu is 961° C., 232° C., and 1085° C., respectively. When the content of Sn is 95 wt % or less, the melting temperature of the alloy nanoparticles cannot be lowered to 250° C. or less and thus, it cannot be used as a solder material since a low melting temperature of 150 to 250° C. is required in order to be used as the solder material. When the melting temperature of alloy nanoparticles is higher than 250° C., it may cause thermal deformation of boards. On the other hand, when it is lower than 150° C., it may be difficult to remove any organic component in the alloy nanoparticles.

According to an embodiment of the invention, size of the alloy nanoparticles may be 1 µm or less, preferably in the range of 5 nm to 300 nm. Even though alloys have the same composition, their melting temperatures may vary with the particle size. The smaller the particle size is the greater total surface area of particles to volume ratio is. Such result shows significant differences in thermodynamic characteristics. As the particle size gets smaller, surface area per unit volume significantly increases. Thus, energy state of particles becomes unstable so that it may be affected by the surface energy which is high. When particles transform from the solid state to the liquid state, surface area tends to be minimized through rearrangement of surface atoms in the liquid state unlike the solid state. It may lower the surface energy by reducing surface atoms having high energy. Therefore, the liquid state of nanoparticles can be stabilized and the melting temperature gets lowered.

The alloy nanoparticles of the invention may be used as metal ink or paste and such ink or paste including the alloy nanoparticles may be manufactured by known methods to a person skilled in the art. For example, ink or paste may be manufactured by dispersing alloy nanoparticles including Ag, Cu and Sn in a solvent and adding a dispersing agent and other additives. Such ink or paste may further include a hardening initiator, a hardening accelerator, a coloring agent and the like and further include an additive to control the viscosity. Such hardening agent or hardening accelerator may be water soluble or soluble by adding an emulsifying agent.

According to another aspect of the invention, a method for manufacturing alloy nanoparticles is provided.

As shown in FIG. 1, a method for manufacturing alloy nanoparticles according to an embodiment of the invention may include dissolving a Sn salt and a surfactant in a solvent (S101), forming Sn nanoparticles by adding a reducing agent into the solution (S102), and forming Sn—Cu alloy nanoparticles by adding a copper salt to the solution including the reducing agent (S103).

Figure 2:
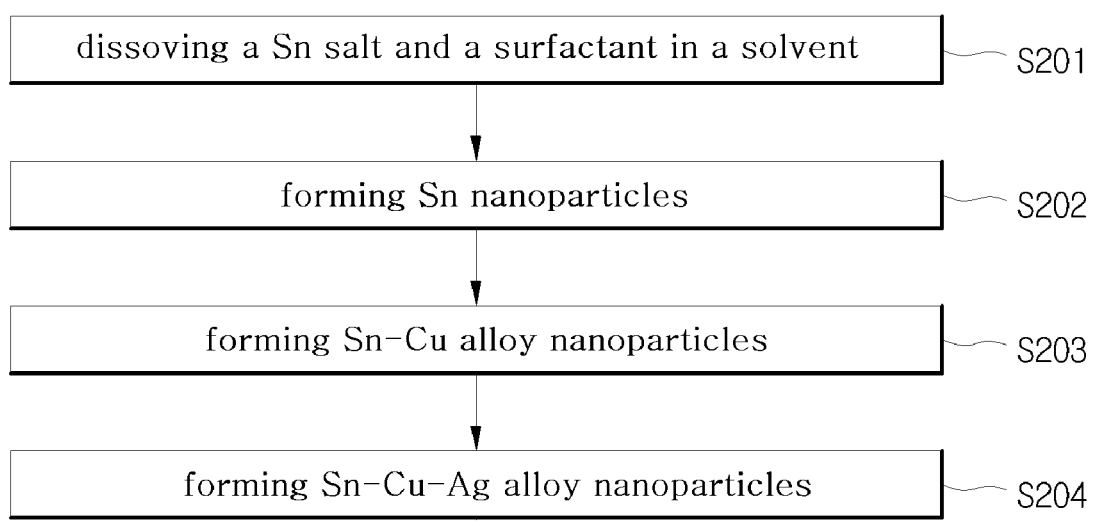
FIG. 2 is a flow chart illustrating a method of manufacturing alloy nanoparticles according to another embodiment of the invention.

Further, as shown in FIG. 2, the method according to another embodiment of the invention may produce Sn—Cu—Ag alloy nanoparticles by further including forming Sn—Cu—Ag alloy nanoparticles by adding a silver salt (S204) after the forming Sn—Cu alloy nanoparticles (S103, S203).

In the method for manufacturing the alloy nanoparticles, the metal salt may be added in order according to relative reduction speed of the metal salt. In the alloy nanoparticle manufacturing, since each metal has different nucleation time and growth conditions, a metal salt having low reduction activity is successively reduced to produce particles having high crystallity. The metal salt having the most reduction activity may be the Sn salt in the alloy nanoparticles manufacturing described above. The Cu salt may be next and the Ag salt is less reductive than the Cu salt. Therefore, the Sn salt, the Cu salt and the Ag salt may be added in order.

In the alloy nanoparticles manufacturing, the Sn salt and a surfactant may be first dissolved in a solvent (S101, S201). Here, the surfactant may be added to reduce the surface tension of particles. The surfactant may be an amphiphilic material possessing both hydrophilic and hydrophobic properties in one molecular. The surfactant is classified into anionic, cationic, zwitterionic (dual charge) and non-ionic and examples may include polyvinyl pyrrolidone (PVP), polyethylenimide (PEI), polymethyl vinyl ether (PMVE), polyvinyl alcohol (PVA), polyoxyethylene alkyl phenyl ether, polyoxyethylene sorbitanmonostearate and derivatives thereof, but it is not limited thereto. The surfactant may be added alone or in a combination of 2 or more.

The solvent may be any solvent used in the reduction reaction of metal salts without any limitation and examples may include ethylene glycol, di(ethylene)glycol, tetra(ethylene)glycol, and 1,5-pentandiol, etc. The solvent may be added alone or in a combination of 2 or more.

Examples of the Sn salt may include $Sn(NO_3)_2$, $SnCl_2$, $SnBr_2$, $SnI_2$, $Sn(OH)_2$, $SnSO_4$, $Sn(CH_3COO)_2$ and $Sn(CH_3COCHCOCH_3)_2$, etc. but it is not limited thereto. The Sn salt may be added directly or as a solution dissolved in a solvent.

After the Sn salt and the surfactant are dissolved in a solvent, a reducing agent may be added to the result solution to form Sn nanoparticles (S102, S202). Here, the reducing agent may be any agent used in the solution phase reduction and known to a person skilled in the art without any limitation. Examples may include a strong reducing agent such as $NaBH_4$, $NH_2NH_2$, $LiAlH_4$, $LiBEt_3H$ and the like and a polyol such as ethylene glycol, tri(ethylene)glycol, tetra(ethylene) glycol and the like and an amine.

The forming Sn nanoparticles by adding the reducing agent (S102) may be performed at a temperature of 100° C. to 260° C., preferably 150 to 250° C. When the temperature is lower than 100° C., unreacted compounds may be remained. On the other hand when it is higher than 260° C., over growth of particles may occur.

After forming Sn nanoparticles by adding the reducing agent, the Cu salt may be added to form Sn—Cu alloy nanoparticles (S103). Here, examples of the Cu salt may include $Cu(NO_3)_2$, $CuCl_2$, $CuBr_2$, $CuI_2$, $Cu(OH)_2$, $CuSO_4$, $Cu(CH_3COO)_2$ and $Cu(CH_3COCHCOCH_3)_2$, etc. but it is not limited thereto. The Cu salt may be added directly or as a solution dissolved in a solvent.

The forming Sn—Cu alloy nanoparticles may be performed within 3 to 60 min after the Sn nanoparticles are formed. When it is performed later than 60 min, each metal may be formed into its own particles so that uniformed alloy cannot be formed. On the other hand, when it is performed within less than 3 min, the other metal salt can be added before the previous metal salt gets reduced which means no more successive reduction of metal salts.

In case of forming Sn—Cu—Ag alloy nanoparticles (S204), the Ag salt may be added after Sn—Cu alloy nanoparticles are formed (S103, S203) as shown in FIG. 2.

Examples of the Ag salt may include $AgNO_3$, AgCl, AgBr, AgI, AgOH, $Ag_2SO_4$, $AgCH_3COO$ and $AgCH_3COCHCOCH_3$ but it is not limited thereto. The Ag salt may be added alone or in a combination of 2 or more. And the Agu salt may be added directly or as a solution dissolved in a solvent.

The forming Sn—Cu—Ag alloy nanoparticles (S204) may be performed within 3 to 60 min after the Sn—Cu alloy nanoparticles are formed. When it is performed later than 60 min, each metal may be formed into its particles so that uniformed alloy cannot be formed. On the other hand, when it is performed within less than 3 min, the other metal salt can be added before the previous metal salt gets reduced which means no more successive reduction of metal salts.

Such produced alloy nanoparticles may be isolated and purified by washing to increase the purity.

Hereinafter, although more detailed descriptions will be given by preparation examples and examples, those are only for explanation and there is no intention to limit the invention.

EXAMPLE 1

Preparation of Alloy Nanoparticles Having Sn:Cu=99.3 wt %:0.7 wt %

0.135 g of $Sn(CH_3COO)$ and 24 equivalents of polyvinyl pyrrolidone (PVP) were added into 1,5-pentanediol (1,5-PD) and dissolved by slowly heating to 200° C. under $N_2$. When the solution was turned into a clear solution, a small amount of $NaBH_4$ sonicated in 1,5-pentanediol was added. As soon as $NaBH_4$ was added, the solution was turned into dark brown color which indicated the formation of Sn particles. The reaction was further performed for 10 min at the same temperature and then 5 mL of $Cu(CH_3COCHCOCH_3)_2$ sonicated in 1,5-pentanediol was added into the reaction solution. The reaction solution was further reacted for 10 min to provide dispersion including alloy nanoparticles having 99.3 wt % Sn-0.7 wt % Cu. Ethanol was added to the dispersion and the mixture was then performed for the centrifugation (8000 rpm, 20 min) 3 times to remove excess amount of remaing surfactant and other organic materials to finally provide target alloy nanoparticle powder.

Figure 3:
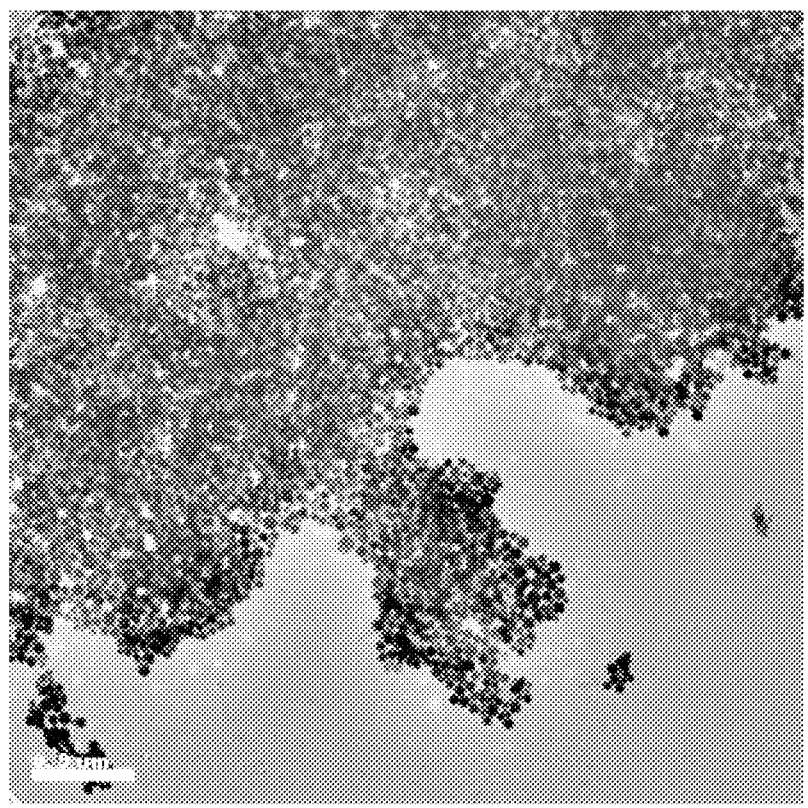
FIG. 3 is a transmission electron microscopy (TEM) result of the alloy nanoparticles according to an embodiment of the invention.

FIG. 3 is a transmission electron microscopy (TEM) result of the alloy nanoparticles according to Example 1 and determines that the alloy nanoparticles having size of 30 nm and 99.3 Sn-0.7 Cu (weight ratio) are formed. It is also noted that dispersion stability is excellent.

Figure 4:
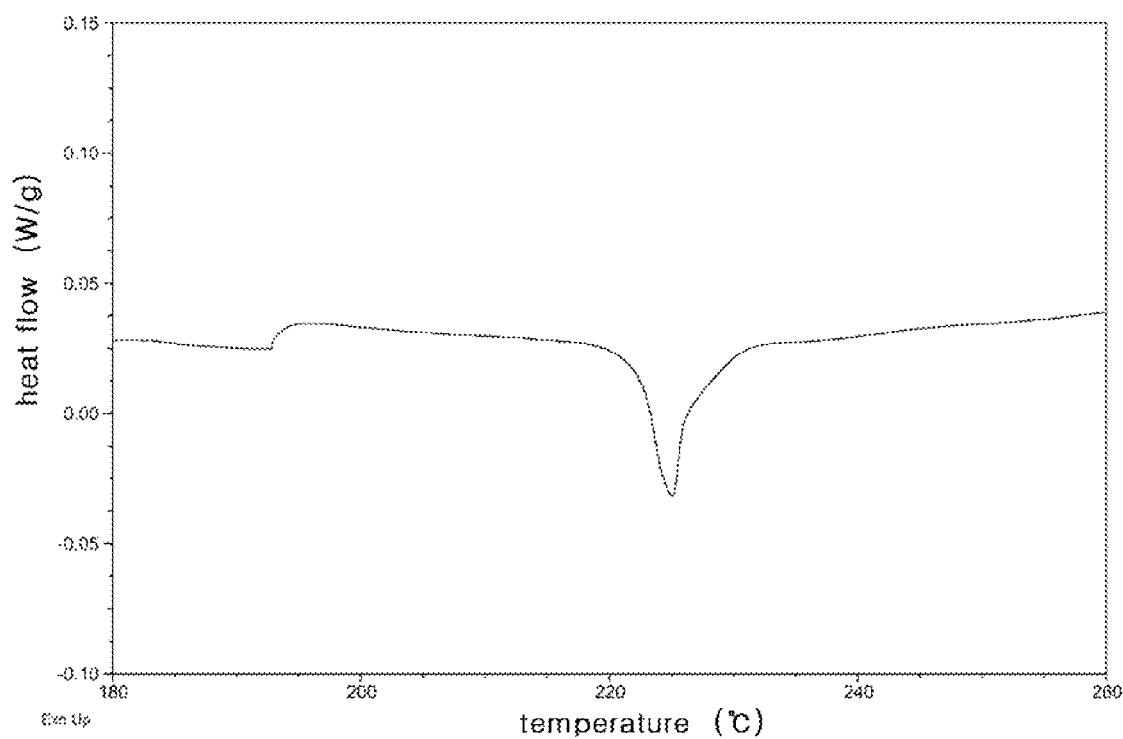
FIG. 4 is a differential scanning calorimetry (DSC) analysis result of the alloy nanoparticles according to Example 1.

FIG. 4 is a differential scanning calorimetry (DSC) analysis result of the alloy nanoparticles according to Example 1. It shows a peak at 225° C. which is closer to 227° C. which is the melting temperature of alloy nanoparticles having 99.3 Sn-0.7 Cu (weight ratio). Thus, it is determined that the alloy nanoparticles having 99.3 Sn-0.7 Cu (weight ratio) is properly formed.

EXAMPLE 2

Preparation of Sn:Cu:Ag=96.5 wt %:0.5 wt %:3.0 wt % Alloy Nanoparticles $Sn(CH_3COO)$ 1.35 g and 24 equivalents of polyvinyl pyrrolidone (PVP) were added into 1,5-pentanediol (1,5-PD) and dissolved by slowly heating to 200° C. under $N_2$. When the solution was turned into a clear solution, a small amount of $NaBH_4$ sonicated in 1,5-pentanediol was added. As soon as $NaBH_4$ was added, the solution was turned into dark brown color which indicated the formation of Sn particles. The reaction was further performed for 10 min at the same temperature and then a small amount of $Cu(CH_3COCHCOCH_3)_2$ sonicated in 1,5-pentanediol was added into the reaction solution. The reaction solution was performed for another 10 min and then $Ag(NO)_3$ sonicated in 1,5-pentanediol was added. The reaction solution was further reacted for 10 min to provide dispersion including alloy nanoparticles having 96.5 wt % Sn-3.0 wt % Ag-0.5 wt % Cu (weight ratio). Ethanol was added to the dispersion and the mixture was then performed for the centrifugation (8000 rpm, 20 min) 3 times to remove excess amount of remaining surfactant and other organic materials to finally provide target alloy nanoparticle powder.

Figure 5:
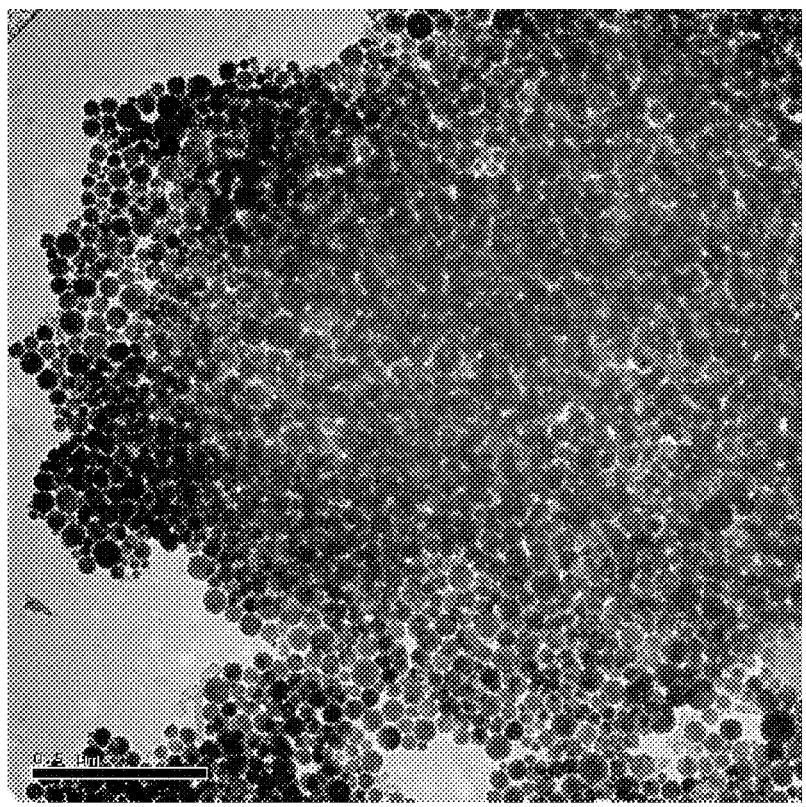
FIG. 5 is a transmission electron microscopy (TEM) result of the alloy nanoparticles according to Example 2.

FIG. 5 is a transmission electron microscopy (TEM) result of the alloy nanoparticles according to Example 2. It is determined that alloy nanoparticles having 96.5 Sn-3.0 Ag-0.5 Cu (weight ratio) are formed.

While the present invention has been described with reference to particular embodiments, it is to be appreciated that various changes and modifications may be made by those skilled in the art without departing from the spirit and scope of the present invention, as defined by the appended claims and their equivalents.

The present invention is not limited to those examples and it is also apparent that more changes may be made by those skilled in the art without departing from the principles and spirit of the present invention.

What is claimed is:

1. A method for manufacturing alloy nanoparticles comprising:
   dissolving a Sn salt and a surfactant in a solvent to form a solution;
   forming Sn nanoparticles by adding a reducing agent into the solution; and forming Sn—Cu nanoparticles by adding a Cu salt to the solution including the previously formed Sn nanoparticles and the reducing agent.

2. The method of claim 1, further comprising forming Sn—Cu—Ag alloy nanoparticles by adding a Ag salt to the solution after the Sn—Cu nanoparticles are formed.

3. The method of claim 1, wherein the solvent is at least one alcohol selected from the group consisting of ethylene glycol, diethylene glycol, tetraethylene glycol, and 1-5-pentandiol.

4. The method of claim 1, wherein the Sn salt is at least one Sn salt selected from the group consisting of $Sn(NO_3)_2$, $SnCl_2$, $SnBr_2$, $SnI_2$, $Sn(OH)_2$, $SnSO_4$, $Sn(CH_3COO)_2$, and $Sn(CH_3COCHCOCH_3)_2$.

5. The method of claim 1, wherein the Cu salt is at least one Cu salt selected from the group consisting of $Cu(NO_3)_2$, $CuCl_2$, $CuBr_2$, $CuI_2$, $Cu(OH)_2$, $CuSO_4$, $Cu(CH_3COO)_2$, and $Cu(CH_3COCHCOCH_3)_2$.

6. The method of claim 2, wherein the Ag salt is at least one Ag salt selected from the group consisting of $AgNO_3$, AgCl, AgBr, AgI, AgOH, $Ag_2SO_4$, $AgCH_3COO$, and $AgCH_3COCHCOCH_3$.

7. The method of claim 1, wherein the forming Sn nanoparticles by adding a reducing agent into the solution is conducted at a temperature of 100 to 260° C.

8. The method of claim 1, wherein the forming Sn—Cu alloy nanoparticles is conducted within 3 to 60 min after the Sn nanoparticles are formed by adding a reducing agent into the solution.

9. The method of claim 2, wherein the forming Sn—Cu—Ag alloy nanoparticles is conducted within 3 to 60 min after the Sn—Cu alloy nanoparticles are formed.

10. The method of claim 1, wherein the alloy nanoparticles comprises Sn in the range of from more than 95 wt % to 99.9 wt % or less and Cu in the range of from 0.1 wt % to more to less than 5 wt %.

11. The method of claim 2, wherein the alloy nanoparticles comprises Sn in the range of from more than 95 wt % to 99.9 wt % or less and Ag and Cu in the range of from 0.1 wt % to more to less than 5 wt %.

* * * * *